Patented Oct. 3, 1933

1,928,728

UNITED STATES PATENT OFFICE 1,928,728

OPEN DRAINAGE LEACHING PROCESS

Harmon E. Keyes, Globe, Ariz.

No Drawing. Application December 31, 1927, Serial No. 244,036. Renewed February 4, 1933

7 Claims. (Cl. 23—268)

In the heap leaching of ores or other products, it has been the practice to allow solutions to be distributed over the surface of the pile and allowed to trickle freely through the mass, the drain at the bottom of the column being constantly open. Recent developments have demonstrated that improved heap leaching methods may be equal to or higher in extraction rates than the standard method of percolation leaching in vats in which the ore is flooded.

Previous methods of distributing solutions which have been used, tried or suggested are, flooding surface areas intermittently, adding solutions from a network of launders, use of perforated pipe or hose to sprinkle the ore, dripping the solution from distributing boxes or spraying it onto the ore. Each of the above schemes involves inherent shortcomings when applied to the recently developed improved heap leaching which employs a permanent bottom and side walls and involves charging and discharging the ore at comparatively short intervals. For example, if the ore be intermittently flooded, the majority of the solution would percolate through the area offering least resistance and much labor is required to prepare the surface uniformly. Such flooding has also other objections, such as cooling of the solution by the atmosphere when the solution is spread over the ore as a thin sheet. The use of launders, perforated hose, pipe or boxes does not afford uniform distribution. Spraying should produce more uniform distribution than the other methods but has the disadvantage of causing excessive cooling of the solution which is particularly objectionable in processes having a high temperature coefficient of extraction rate, such as leaching copper sulphides with acidulated ferric sulphate solution. It is essential, as I have found, to evenly distribute the solution throughout the charge if efficient and rapid leaching is to be maintained. Furthermore, the means of solution distribution is one of the major factors involved in the mechanical design of a plant.

The criteria for a suitable method of distributing solutions in the improved type of heap leaching are, therefore, (1) control of rate of flow in the heap; (2) uniformity of flow through any given section of the charge; (3) a minimum of cooling effect by the atmosphere when adding the solution.

My proposed method, as described below, not only conforms to these criteria but is very inexpensive to install and operate as compared to the other methods.

The ore, previous to charging, may be dry, moist or agglomerated, depending upon the percentage of fines and the results desired. In a porous charge of uniform texture if a solution is added from one point it will percolate downward with very little lateral diffusion. According to the fineness of the capillaries and the compactness of the charge the solution will diffuse laterally rather than to trickle downward. My method is devised to utilize natural forces and to cause solution added from a single point, or a relatively small number of points, to distribute itself uniformly into the charge and diffuse readily through a considerable area, thereby obtaining solution contact with all of the charge.

The addition of the solution from a single point or small number of points makes it possible to introduce it into the charge from a single pipe or group of pipes, thus keeping it out of contact with the air and minimizing any tendency to cooling. The lateral diffusion of the solution through the charge and the uniform percolation is effected by charging the ore in such a manner that the finest material lies directly under the point of application of the solution. This is accomplished by charging the ore from a point above the vat which is coincident with the point of application of the solution. This causes the charge to build up in the form of a cone, the finest material being in a perpendicular line from the vertex, the size becoming coarser toward the surface of the cone.

Charging is continued until the apex of the cone covers the discharge of the solution pipe. In a small plant charging of a heap might be done from a single point, there being only one pipe or unit group of pipes for adding the solution. However, in a large installation charging may be done from a number of points, thus building up a series of cones, the vertex of each cone corresponding to the location of the discharge of the solution pipes. For a given heap the greater the number of these cones the greater the tonnage capacity of the heap, the more uniform the solution distribution and the more expensive the installation. Therefore, the determination of the proper number of said cones is a matter of economics to be determined for each plant.

By adding the solution at the vertex of a cone, as above described, the natural tendency for the flow to be greatest under the solution pipe is counteracted by the maximum degree of fineness being at this point. This results in dispersion of the solution laterally, and as the material becomes coarser on approaching the surface of the cone the solution readily diffuses to the outside surface as it travels down. By the time the bottom of the cone, or series of cones, has been reached, the solution in travelling downwardly and laterally will make contact with all portions of the charge. If the heap is retained by vertical sides the solution will be dispersed throughout the entire cross section by the time it reaches these sides.

By reason of the fact that the solution itself is at no time exposed to the outside atmosphere, with the exception of the small amount actually on the surface of the cones, heat dissipation is minimal, the heat in the solution being applied to the ore with a high efficiency.

This method has a further advantage over former methods in that the cone of the ore may have its vertex a considerable distance above the sides of the container, thereby making possible an increased tonnage as compared to a vat with side walls of the same height.

By considering the structure of a cone thus built up it is seen that the finest material remains at the vertex while the coarsest rolls down the slope toward the bottom. Horizontal sections at any height would reveal an increase in size as the distance from the center is increased. Vertical sections along a plane perpendicular to the base would show an increase in size of ore particles as depth increased. This increase in size of particles away from the center assists the lateral diffusion of the solution toward the outside surface. The increase in size of particles with increasing depth tends to prevent clogging of the solution toward the bottom.

In order to secure the best results by the above described method the percentage of coarse and fine material should be properly proportioned. This, as well as the maximum size, are matters that are easily determinable for each specific case.

In certain instances there may be a tendency to sluicing action at the top, due to the material at the top of the cone being too fine to absorb solution at the required rate. This may be obviated by leveling off the top of the cone and finishing the charge by building up the vertex with coarser material. This will permit the solution to be absorbed into the charge without sluicing at any point. Such details may be adjusted according to the specific needs.

While I have described a specific method of treatment, it is to be understood that this is for the purpose of explaining the underlying principles of the invention and since these may be embodied in other specific methods involving modified procedure I do not wish to be limited to the one described except as such limitations are clearly imposed by the appended claims.

I claim:
1. A process of leaching material comprising introducing a leaching solution downwardly at a point beneath the apex of a conical pile of the material, said conical pile being so formed that the material assumes its natural angle of repose.

2. A process of leaching material comprising introducing a leaching solution downwardly at the apex of a conical pile of the material through a conduit embedded in the cone, said cone being so formed that the material assumes its natural angle of repose.

3. A method of securing even distribution of a leaching solution in a charge of material comprising depositing the material in a pile in which the particle size increases substantially as the distance from the vertical center line and as the depth of the charge and adding a leaching solution near the top and center of the pile.

4. A method of securing even distribution of a leaching agent in a charge of material comprising building up the charge in such a manner that the particle sizes increase with the depth of the charge, and placing a mass of large size particles on the upper portion thereof, and introducing a leaching agent into the large size particles at the upper portion of the charge.

5. A method of securing even distribution of a leaching agent in a charge of material comprising depositing the material in a naturally formed conical pile, leveling off the top of the pile, heaping large size particles thereon and introducing a leaching solution into the upper portion thereof.

6. A method of securing an even distribution of a leaching solution in a charge of material comprising building the charge in the shape of a cone so that the size of the particles of material increases with the depth from the apex and with the distance from the axis of the cone, and introducing the leaching solution at the apex of the material, said leaching solution being introduced in a conduit embedded in the material.

7. A method of securing an even distribution of a leaching agent in a charge of material comprising forming the charge of a conical shape so that the size of the particles therein varies with the depth from the apex and the distance from the axis of the cone, and placing coarse material at the apex of the cone to prevent sluicing, said leaching agent being introduced in a single stream near the apex of the cone.

HARMON E. KEYES.

Patent No. 1,928,728 Granted October 3, 1933

HARMON E. KEYES

The above entitled patent was extended October 2, 1951, under the provisions of the Act of June 30, 1950, for 6 years and 82 days from the expiration of the original term thereof.

*Commissioner of Patents.*